US010768872B2

(12) United States Patent
Kaneko (10) Patent No.: US 10,768,872 B2
(45) Date of Patent: Sep. 8, 2020

(54) IMAGE FORMING APPARATUS PERFORMING HOLD PRINTING, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Takayuki Kaneko, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/129,105

(22) Filed: Sep. 12, 2018

(65) Prior Publication Data
US 2019/0095152 A1 Mar. 28, 2019

(30) Foreign Application Priority Data
Sep. 28, 2017 (JP) .................. 2017-188363

(51) Int. Cl.
*G06K 15/00* (2006.01)
*G06F 3/12* (2006.01)
(52) U.S. Cl.
CPC .......... *G06F 3/1238* (2013.01); *G06F 3/1222* (2013.01); *G06F 3/1253* (2013.01); *G06F 3/1267* (2013.01); *G06F 3/1274* (2013.01); *G06F 3/1285* (2013.01)
(58) Field of Classification Search
None
See application file for complete search history.

(56) References Cited

U.S. PATENT DOCUMENTS

| | | | |
|---|---|---|---|
| 8,395,791 B2 | 3/2013 | Imamura et al. | |
| 2009/0153901 A1* | 6/2009 | Imamura | G06F 21/608 358/1.15 |
| 2010/0007909 A1* | 1/2010 | Aikens | G06F 3/1222 358/1.15 |
| 2010/0225964 A1* | 9/2010 | Furukawa | G06F 3/1204 358/1.15 |
| 2015/0153986 A1* | 6/2015 | Lin | G06F 3/1267 358/1.15 |
| 2016/0210094 A1* | 7/2016 | Nishikawa | H04N 1/00411 |
| 2018/0069978 A1* | 3/2018 | Iwabuchi | H04N 1/3201 |
| 2018/0246683 A1* | 8/2018 | Takahashi | G06F 3/1238 |

FOREIGN PATENT DOCUMENTS

JP 2009143081 A 7/2009

* cited by examiner

*Primary Examiner* — Henok Shiferaw
(74) *Attorney, Agent, or Firm* — Rossi, Kimms & McDowell LLP

(57) ABSTRACT

An image forming apparatus that is capable of reducing the leaving of printed matter due to lack of the function of the forcible hold mode. A setting unit sets one of a valid state and an invalid state about a forcible hold printing function that holds print job data when the print job data is received and prints using the print job data held in response to a user's print instruction. A storage unit stores the print job data. A deletion unit deletes time-setting print job data that will start printing at set-up designated time when the time-setting print job data is stored in the storing unit and when the forcible hold printing function is switched from the invalid state to the valid state before printing using the time-setting print job data concerned.

9 Claims, 10 Drawing Sheets

| 1002 RECEIVING DATE | 1003 USER ID | 1004 PRINT JOB DATA NAME | 1005 OUTPUT METHOD | 1006 RESERVATION TIME | 1007 STORING LOCATION |
|---|---|---|---|---|---|
| 2017/06/03 9:00 | Kaneko | AAA.txt | Hold Printing | NULL | /data/Kaneko/doc1 |
| 2017/06/03 9:05 | Sato | BBB.pdf | Reservation Printing | 2017/06/04/03:00 | /data/Sato/doc1 |
| 2017/06/03 10:00 | Kaneko | CCC.doc | Hold Printing | NULL | /data/Kaneko/doc2 |
| 2017/06/03 10:00 | Kaneko | DDD.doc | Hold Printing | NULL | /data/Kaneko/doc3 |
| 2017/06/03 11:00 | Suzuki | EEE.doc | Reservation Printing | 2017/06/04/04:00 | /data/Suzuki/doc1 |
| 2017/06/03 12:00 | Suzuki | FFF.doc | Reservation Printing | 2017/06/04/04:30 | /data/Suzuki/doc2 |

IMAGE FORMING APPARATUS PERFORMING HOLD PRINTING, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus that performs hold printing, a control method therefor, and a storage medium storing control program therefor.

Description of the Related Art

There is a known MFP as an image forming apparatus that performs reservation printing of obtained print job data. The reservation printing starts printing the print job data at designated time set in the print job data. For example, when a user sets a time zone during which a use frequency of the MFP is relatively low like midnight or lunch break as a designated time for large volume printing, use of the MFP by another user is not obstructed. In the meantime, since the reservation printing starts printing even if a user is apart from the MFP, there is an extremely high possibility that printed matter is left as-is, which increases a risk of leak of information like furtive glance of the printed matter that is left as-is by another malicious user. Against this, an MFP (hereinafter referred to as a "forcible hold MFP") equipped with an operation mode (hereinafter referred to as a "forcible hold mode") in which hold printing is executed for all print job data received is developed. An administrator sets up the forcible hold mode to a valid state or an invalid state according to a security policy in an environment where the forcible hold MFP is used. For example, when the forcible hold MFP is used in a high security level environment that does not allow printed matter to be left as-is, the forcible hold mode is set to the valid state. When the forcible hold mode is set to the valid state, the forcible hold MTP temporarily stores received print job data into a storage unit of the forcible hold MFP without printing the print job data immediately. The forcible hold MFP starts printing the print job data when a user issues a print instruction through an operation unit of the forcible hold MFP (for example, see Japanese Laid-Open Patent Publication (Kokai) No. 2009-143081 (JP 2009-143081A)). This reduces the leaving of printed matter caused by starting printing in the state where the user is apart from the MFP.

However, the conventional forcible hold MFP may not enable the forcible hold mode and printed matter may be left as-is. For example, when the forcible hold mode is switched from the invalid state to the valid state, the print job data received when the forcible hold mode is invalid should be also subjected to the hold printing. However, the conventional forcible hold MFP starts printing the print job data received when the forcible hold mode is invalid at the designated time of the print job data irrespective of the current state of the forcible hold mode. That is, the conventional forcible hold MFP cannot apply the function of the forcible hold mode to the print job data received before switching the forcible hold mode to the valid state and has a problem that printed matter is left as-is.

SUMMARY OF THE INVENTION

The present invention provides an image forming apparatus, a control method therefor, and a storage medium storing a control program therefor, which are capable of reducing the leaving of printed matter due to lack of the function of the forcible hold mode.

Accordingly, a first aspect of the present invention provides an image forming apparatus comprising a setting unit configured to set one of a valid state and an invalid state about a forcible hold printing function that holds print job data when the print job data is received and prints using the print job data held in response to a user's print instruction, a storage unit configured to store the print job data; and a deletion unit configured to delete time-setting print job data that will start printing at set-up designated time when the time-setting print job data is stored in the storing unit and when the forcible hold printing function is switched from the invalid state to the valid state before printing using the time-setting print job data concerned.

Accordingly, a second aspect of the present invention provides an image forming apparatus comprising a setting unit configured to set one of a valid state and an invalid state about a forcible hold printing function that holds print job data when the print job data is received and prints using the print job data held in response to a user's print instruction, a storage unit configured to store the print job data, and a management unit configured to manage an attribute of the print job data stored and configured to change an attribute of time-setting print job data that will start printing at set-up designated time to an attribute corresponding to hold-print job data that starts printing in response to a user's print instruction when the time-setting print job data is stored in the storage unit and when the forcible hold printing function is switched from the invalid state to the valid state before printing using the time-setting print job data concerned.

Accordingly, a third aspect of the present invention provides a control method for an image processing apparatus, the control method comprising a setting step of setting one of a valid state and an invalid state about a forcible hold printing function that holds print job data when the print job data is received and prints using the print job data held in response to a user's print instruction, a storing step of storing the print job data, and a deletion step of deleting time-setting print job data that will start printing at set-up designated time when the time-setting print job data is stored in the storage unit and when the forcible hold printing function is switched from the invalid state to the valid state before printing using the time-setting print job data concerned.

Accordingly, a fourth aspect of the present invention provides a control method for an image processing apparatus, the control method comprising a setting step of setting one of a valid state and an invalid state about a forcible hold printing function that holds print job data when the print job data is received and prints using the print job data held in response to a user's print instruction, a storing step of storing the print job data, and a management step of managing an attribute of the print job data stored and of changing an attribute of time-setting print job data that will start printing at set-up designated time to an attribute corresponding to hold-print job data that starts printing in response to a user's print instruction when the time-setting print job data is stored in the storage unit and when the forcible hold printing function is switched from the invalid state to the valid state before printing using the time-setting print job data concerned.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, the leaving of the printed matter due to lack of the function of the forcible hold mode is reduced.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
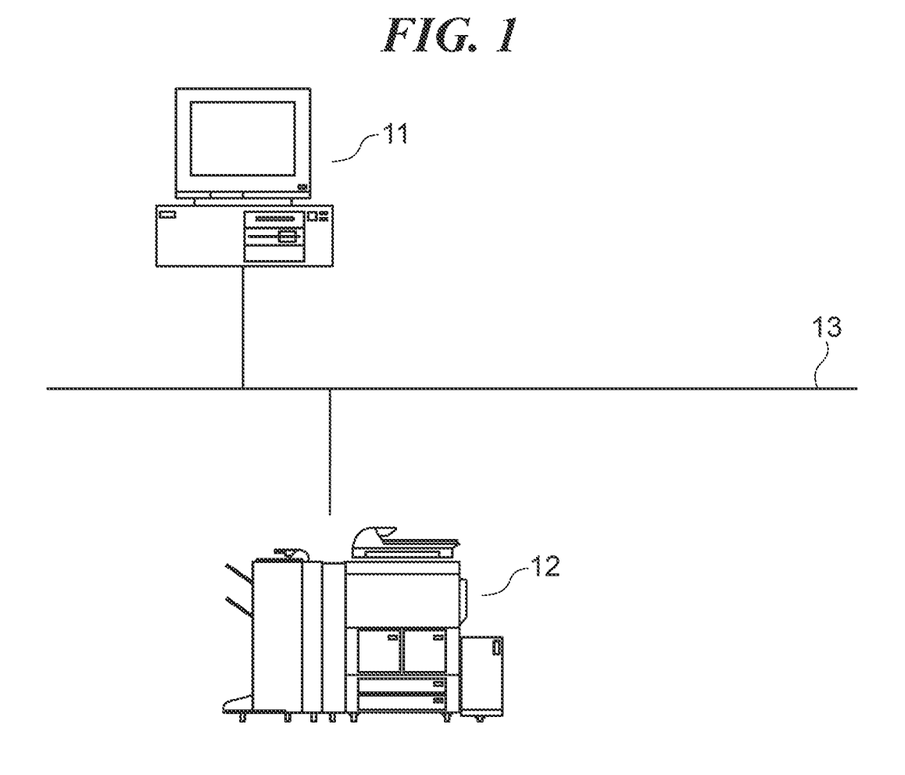
FIG. 1 is a view for describing a network configuration including an MFP that is an image forming apparatus according to an embodiment of the present invention.

FIG. 1 is a view for describing a network configuration including an MFP 12 that is an image forming apparatus according to an embodiment of the present invention.

As shown in FIG. 1, a PC 11 and the MFP 12 are connected via a LAN 13. The PC 11 generates job data used for executing a job and sends the generated job data to the MFP 12 etc. via the LAN 13. The PC 11 generates print job data that makes the MFP 12 execute a print process, for example.

The MFP 12 is provided with a plurality of functions, such as a print function, a scan function, and a communication function. When receiving print job data from the PC 11, for example, the MFP 12 executes a print process using the above-mentioned print job data. An output method (attribute value), such as normal printing or hold printing, is set to the print job data. When receiving print job data (hereinafter referred to as "usual print job data") in which the usual printing is set as the output method, the MFP 12 immediately executes a print process using the above-mentioned usual print job data. In the meantime, when receiving print job data (hereinafter referred to as "hold-print job data") in which the hold printing is set as the output method, the MFP 12 does not immediately execute a print process using the above-mentioned hold-print job data. The MFP 12 temporarily stores the hold-print job data into a storage unit 304 in FIG. 3 and executes a print process using the above-mentioned hold-print job data when a print instruction by a user who logged in to the MFP 12 is received.

Moreover, the MFP 12 is provided with a forcible hold mode that does not allow printed matter to be left as-is besides a usual print mode in which the print process corresponding to the output method set in the print job data is executed as mentioned above. When the forcible hold mode is set up, the MFP 12 does not immediately execute the print process using the received print job data even if the received print job data is the usual print job data. The MFP 12 temporarily stores the usual print job data into the storage unit 304 and executes a print process using the above-mentioned usual print job data when a print instruction by a user who logged in to the MFP 12 is received. That is, in the embodiment, all the print job data received in the forcible hold mode are processed as the hold-print job data.

Figure 2:
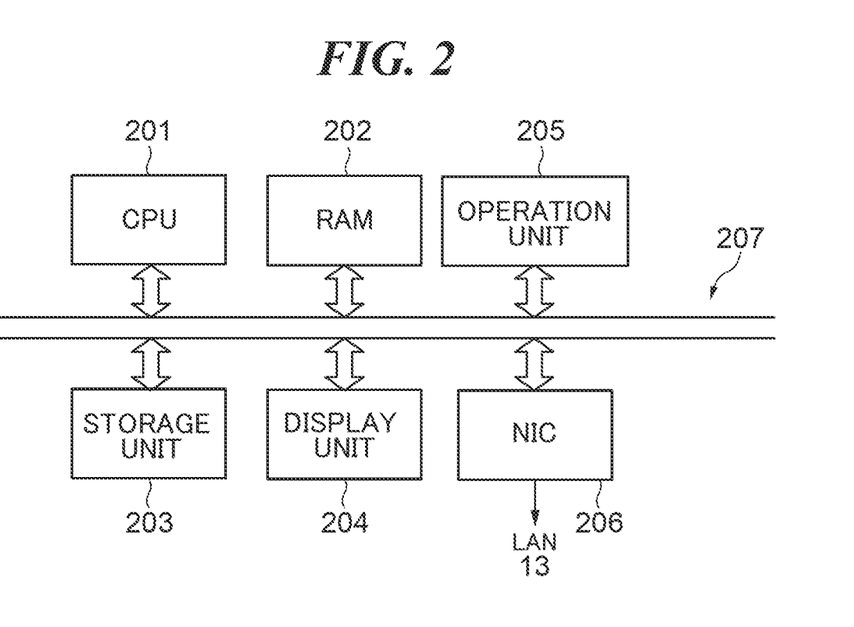
FIG. 2 is a block diagram schematically showing a hardware configuration of a PC in FIG. 1.

FIG. 2 is a block diagram schematically showing a hardware configuration of the PC 11 in FIG. 1.

As shown in FIG. 2, the PC 11 is provided with a CPU 201, a RAM 202, a storage unit 203, a display unit 204, an operation unit 205, and a NIC (Network Interface Card) 206. The CPU 201, RAM 202, storage unit 203, display unit 204, operation unit 205, and NIC 206 are mutually connected via a main bus 207.

The CPU 201 controls each process of a software module 600 in FIG. 6 mentioned later. The RAM 202 is used as a working area of the CPU 201, and is used as a temporary storage area for data. The storage unit 203 is an auxiliary storage unit, such as a hard disk, a floppy disk, or a CD-ROM, and stores programs that are executed by the CPU 201. The display unit 204 is a CRT display or an LCD that displays a message, a setting screen, etc. The operation unit 205 includes a mouse, a keyboard, etc. and notifies the CPU 201 of a user's operation content. The NIC 206 performs data communication with a communication device connected to the LAN 13.

Figure 3:
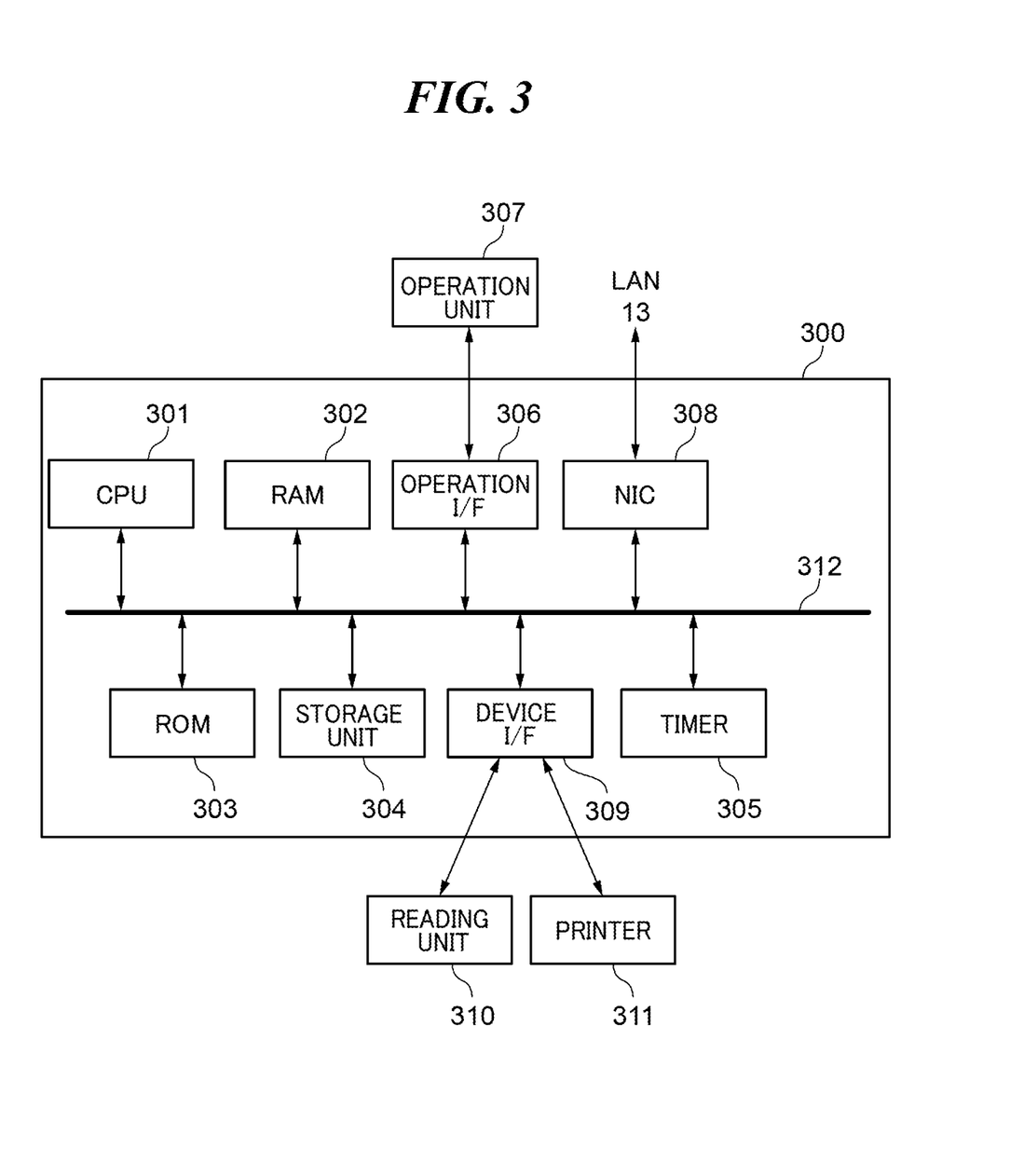
FIG. 3 is a block diagram schematically showing a hardware configuration of the MFP in FIG. 1.

FIG. 3 is a block diagram schematically showing a hardware configuration of the MFP 12 in FIG. 1.

As shown in FIG. 3, the MFP 12 is provided with a controller 300, an operation unit 307, a reading unit 310, and a printer 311. The controller 300 is connected with the operation unit 307, the reading unit 310, and the printer 311. Moreover, the controller 300 is provided with a CPU 301, a RAM 302, a ROM 303, a storage unit 304, a timer 305, an operation I/F 306, a NIC 308, and a device I/F 309. The CPU 301, RAM 302, ROM 303, storage unit 304, timer 305, operation I/F 306, NIC 308, and device I/F 309 are mutually connected via a main bus 312.

The controller 300 totally controls the entire MFP 12. The CPU 301 develops a program stored in the ROM 303 or the storage unit 304 onto the RAM 302 and runs the program so as to control each section. The RAM 302 is used as a working area of the CPU 301, and is used as a temporary storage area for data. For example, an OS (Operation System) of the MFP 12, a software module 900 in FIG. 9 mentioned later, and programs executing applications are developed to the RAM 302. The ROM 303 stores the above-mentioned programs and data that is needed for image formation. The storage unit 304 is an auxiliary storage unit, such as a hard disk or a CD-ROM, and is used for storing data temporarily or is used as a substitute of the RAM 302. The timer 305 manages time.

The operation I/F 306 connects the operation unit 307 to the main bus 312. The operation unit 307 displays setting screens of the MFP 12, messages, etc. and notifies the CPU 301 of an input value that is input by the user. For example, the operation unit 307 displays a mode setting screen 400 in FIG. 4 through which the forcible hold mode is set. The mode setting screen 400 includes an ON button 401, OFF button 402, and OK button 403. The ON button 401 is an operation button for setting the forcible hold mode to a valid state. Selection of the ON button 401 sets an operation mode of the MFP 12 to the forcible hold mode. The OFF button 402 is an operation button for setting the forcible hold mode to an invalid state. Selection of the OFF button 402 sets the operation mode of the MFP 12 to a normal printing mode. The user is able to select one of the ON button 401 and OFF button 402. The OK button 403 is an operation button that fixes the setting in the mode setting screen 400. Setting in the mode setting screen 400 is managed by the storage unit 304 as a mode set value 501 in FIG. 5. For example, when the OK button 403 is selected in the state where the ON button 401 is selected, "1" showing that the forcible hold mode is valid is set as the mode set value 501. In the meantime, when the OK button 403 is selected in the state where the OFF button 402 is selected, "0" showing that the forcible hold mode is invalid is set as the mode set value 501.

The NIC 308 performs data communication with communication devices, such as the PC 11, via the LAN 13. The device IT 309 connects the reading unit 310 to the main bus 312 and connects the printer 311 to the main bus 312. The reading unit 310 reads a stacked original and generates image data on the basis of a read signal. The image data is stored in the RAM 302 or the storage unit 304. The printer 311 prints the image data that are generated by the reading unit 310 on a sheet.

Figure 6:
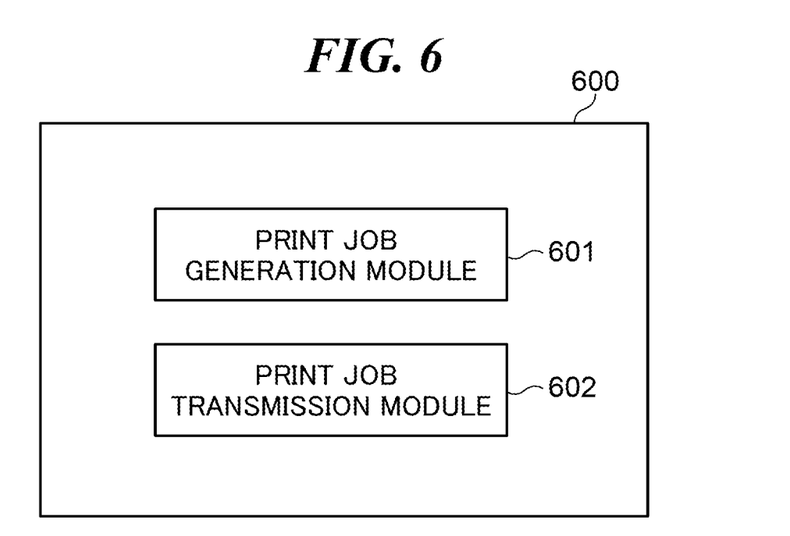
FIG. 6 is a block diagram schematically showing a configuration of a software module of the PC in FIG. 1.

FIG. 6 is a block diagram schematically showing a configuration of the software module 600 of the PC 11 in FIG. 1.

As shown in FIG. 6, the software module 600 is provided with a print job generation module 601 and a print job transmission module 602. Each process of the software module 600 is executed when the CPU 201 runs a program stored in the storage unit 203.

Figure 7:
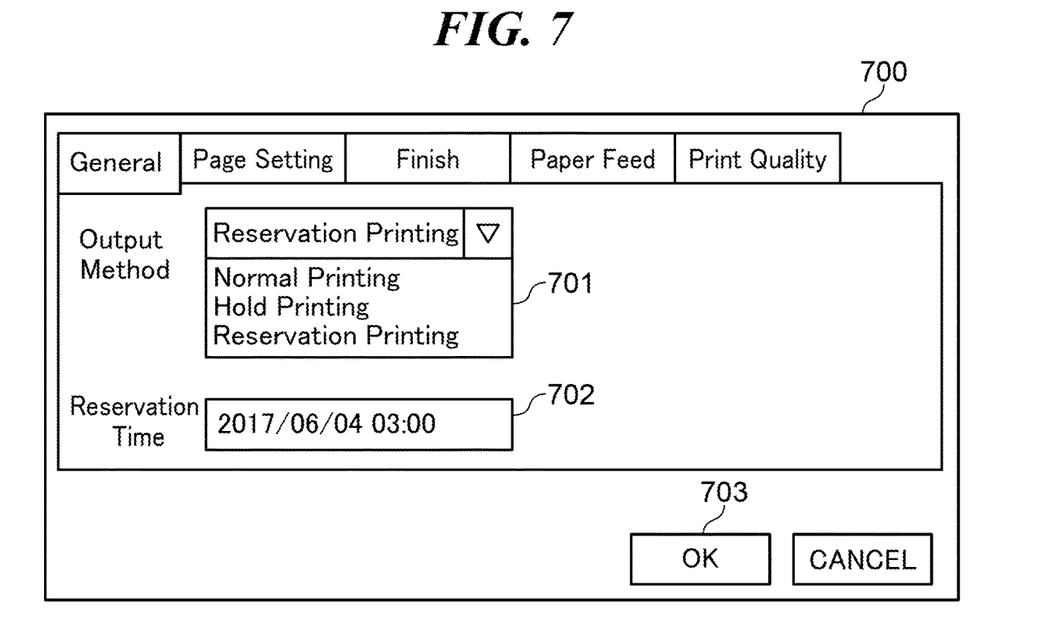
FIG. 7 is a view showing an example of a print setting screen displayed on the operation unit in FIG. 2.

The print job generation module 601 generates print job data on the basis of each input value that the user inputs using a print setting screen 700 in FIG. 7. In the print setting screen 700, the user sets up the output method of the print job data using a pull-down menu 701, for example. In the pull-down menu 701, "Normal Printing", "Hold Printing", and "Reservation printing" are displayed. When the PC 12 sends the print job data (hereinafter referred to as "reservation print job data") (time-setting print job data) in which the reservation printing is set as the output method to the MFP 12, the MFP 12 does not immediately execute the print process using the received reservation print job data and stores the reservation print job data into the storage unit 304 temporarily. The MFP 12 executes the print process using the above-mentioned reservation print job data at the reservation time (designated time) set in the reservation print job data. The above-mentioned reservation time is input into a reservation time-setting field 702. It should be noted that the reservation time input into the reservation time-setting field 702 is absolute time or relative time to the current time. When an OK button 703 is selected, the print job generation module 601 generates print job data 801 in FIG. 8 on the basis of the set values set in the print setting screen 700.

Figure 8:
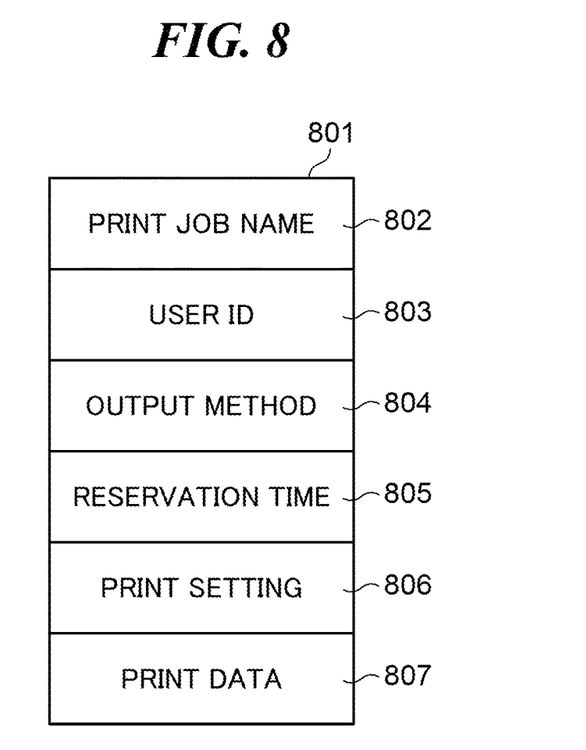
FIG. 8 is a view for describing a configuration of print job data generated by the PC in FIG. 1.

The print job data 801 includes a print job name section 802, a user ID section 803, an output method section 804, a reservation time section 805, a print setting section 806, and a print data section 807. The print job name section 802 stores a name of the print job data to generate. The user ID 803 stores a user ID that specifies the user who sets up using the print setting screen 700. The output method section 804 stores a set value set up using the pull-down menu 701. The reservation time section 805 stores a set value input into the reservation time-setting field 702. The print setting section 806 stores set values, such as the number of print copies, a staple setting, a punch setting, a feed setting, a resolution setting, and a printing color, which are set in the print setting screen 700. The print data section 807 stores data showing characters and images to print. The print job transmission module 602 sends the print job data 801 generated by the print job generation module 601 to the MFP 12.

Figure 9:
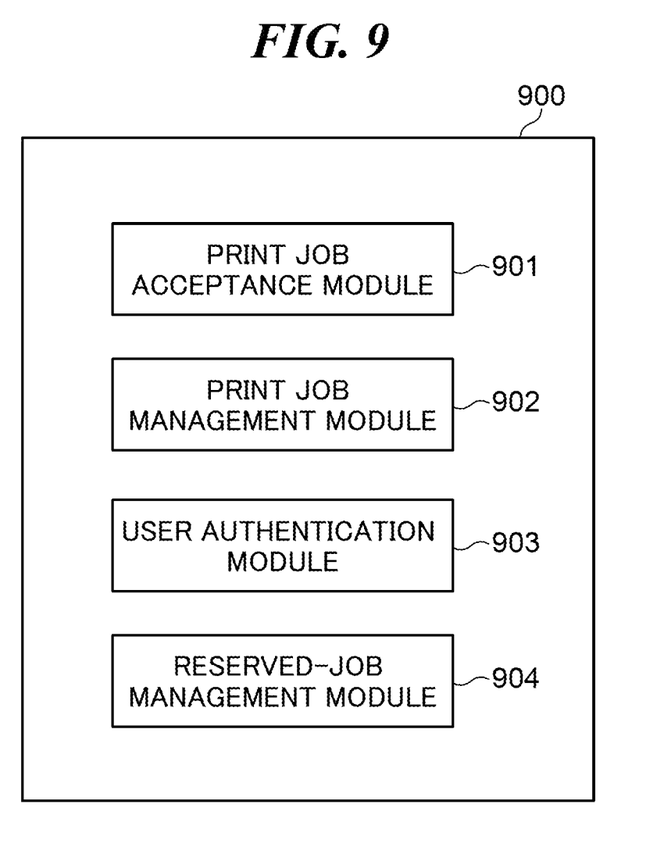
FIG. 9 is a block diagram schematically showing a configuration of a software module of the MFP in FIG. 1.

FIG. 9 is a block diagram schematically showing a configuration of the software module 900 of the MFP 12 shown in FIG. 1.

As shown in FIG. 9, the software module 900 is provided with a print job acceptance module 901, a print job management module 902, a user authentication module 903, and a reserved-job management module 904. Each process of the software module 900 is executed when the CPU 301 runs a program stored in the ROM 303 or the storage unit 304.

The print job acceptance module 901 transfers the print job data 801 received from the PC 11 to the print job management module 902. The print job management module 902 manages the print job data using a held job list 1001 in FIG. 10 stored in the ROM 303 or the storage unit 304. Attributes about the print job data stored in the storage unit 304 among the received print job data are registered into the print job management module 902. The held job list 1001 is provided with a receiving date field 1002, a user ID field 1003, a print job data name field 1004, an output method field 1005, a reservation time field 1006, and a stored location field 1007. Date and time at which the MFP 12 received the stored print job data is set to the receiving date field 1002. The user ID that specifies the user who instructed the transmission of the stored print job data is set to the user ID field 1003. A data name of the stored print job data is set to the print job data name field 1004. The output method, which is "Hold Printing" or "Reservation Printing" specifically, included in the stored print job data is set to the output method field 1005. The reservation time included in the stored print job data is set to the reservation time field 1006. When the print job data stored in the storage unit 304 is hold-print job data that does not include reservation time, "Null" is set to the reservation time field 1006. The storing location of the stored print job data is set to the storing location field 1007.

The user authentication module 903 authenticates the user on the basis of the user information that the user inputs using the operation unit 307. The reserved-job management module 904 manages reservation print job data among a plurality of print job data managed by the print job management module 902.

Figure 11:
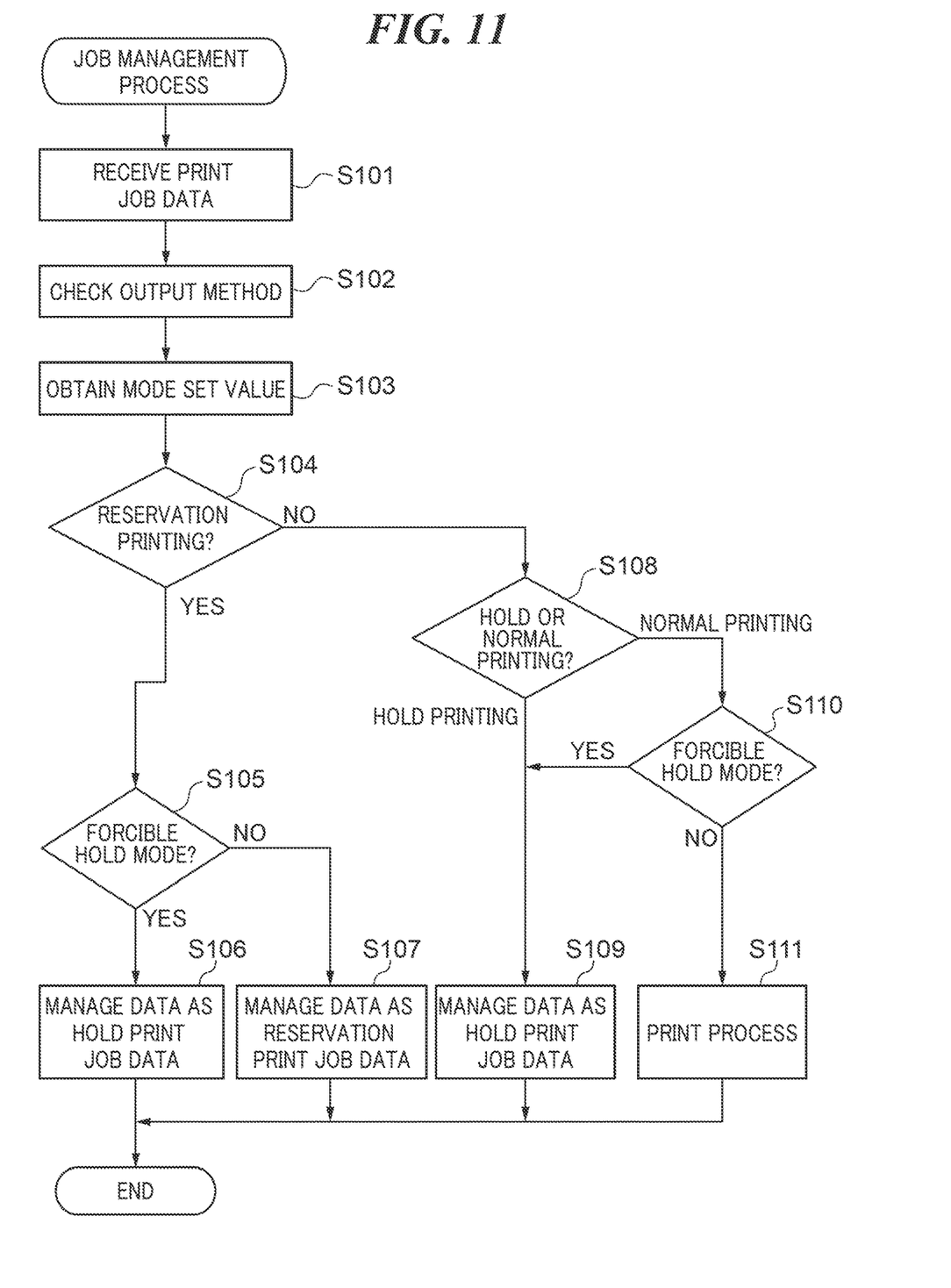
FIG. 11 is a flowchart showing procedures of a job management process executed by the MFP in FIG. 1.

FIG. 11 is a flowchart showing procedures of a job management process executed by the MFP 12 in FIG. 1.

Figure 4:
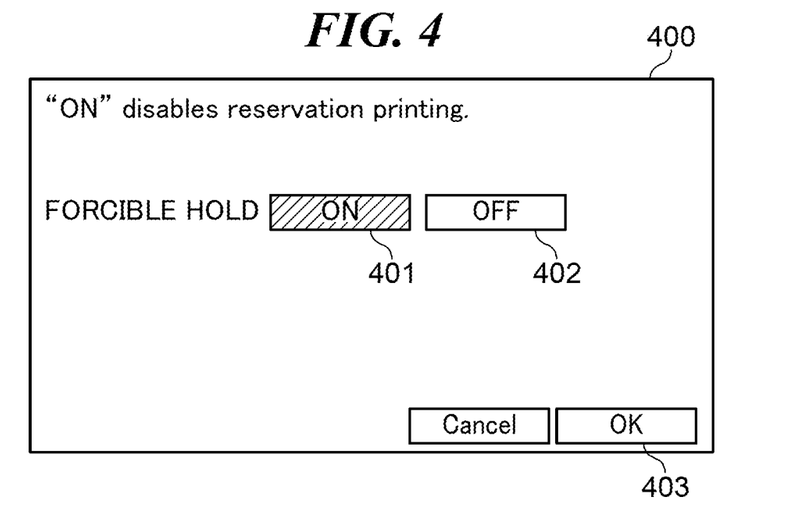
FIG. 4 is a view showing an example of a mode setting screen displayed on an operation unit in FIG. 3.
Figure 5:
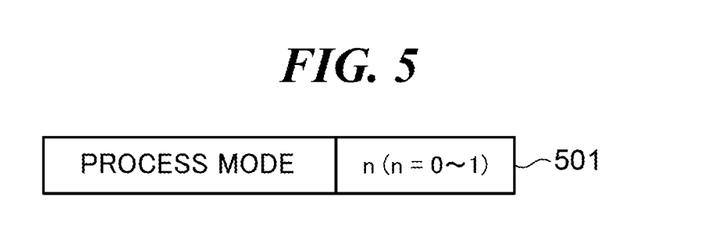
FIG. 5 is a view showing an example of a mode set value used by the MFP in FIG. 1.

The process in FIG. 11 is executed when the CPU 301 runs the program stored in the ROM 303 or the storage unit 304. The process in FIG. 11 is premised that the user has set using the mode setting screen 400 and that the print job data 801 has been sent to the MFP 12 from the PC 11 as an example.

As shown in FIG. 11, when receiving the print job data 801 from the PC 11 (step S101), the CPU 301 first analyzes the print job data 801 using the print job management module 902. The CPU 301 checks the output method set in the print job data 801 (step S102). Next, the CPU 301 obtains the mode set value 501 from the storage unit 304 (step S103). Next, the CPU 301 determines whether the output method set in the print job data 801 is "Reservation Printing" (step S104).

As a result of the determination in the step S104, when the output method set in the print job data 801 is "Reservation Printing", the CPU 301 determines whether the operation mode of the MFP 12 is the forcible hold mode (step S105). In the step S105, the CPU 301 determines that the operation mode of the MFP 12 is the forcible hold mode when "1" showing that the forcible hold mode is valid is set to the mode set value 501 obtained in the step S103. In the meantime, the CPU 301 determines that the operation mode of the MFP 12 is not the forcible hold mode when "0" showing that the forcible hold mode is invalid is set to the mode set value 501.

Figure 10:
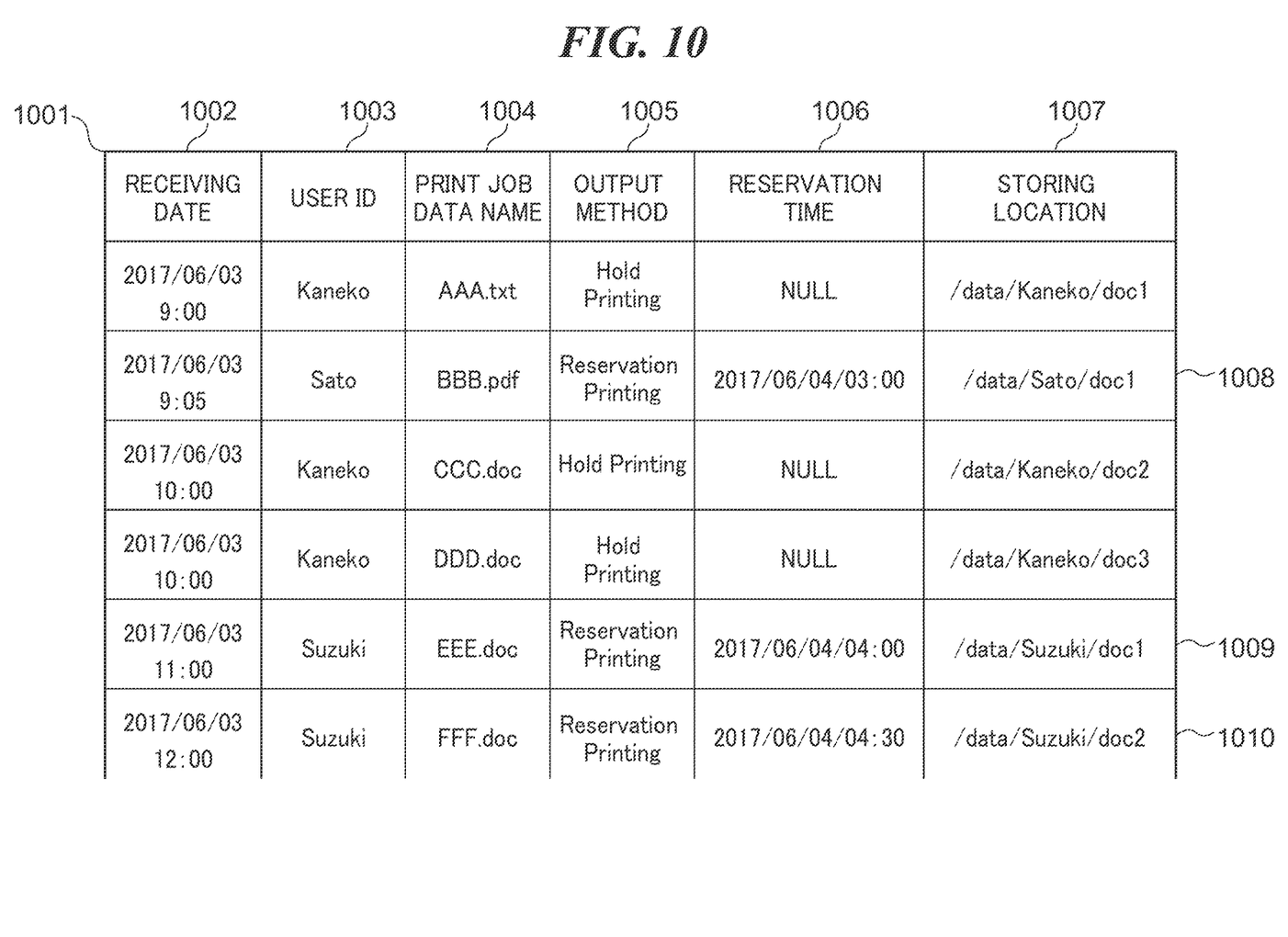
FIG. 10 is a view showing an example of a held job list managed by the MFP in FIG. 1.

As a result of the determination in the step S105, when the operation mode of the MFP 12 is the forcible hold mode, the CPU 301 manages the print job data 801 as the hold-print job data (step S106). In step the S106, the CPU 301 stores the print job data 801 into the storage unit 304. Moreover, the CPU 301 registers the print job data 801 into the held job list 1001 as the hold-print job data. Specifically, the CPU 301 sets "Hold Printing" to the output method field 1005 and sets "Null" to the reservation time field 1006 of the held job list 1001 as the attributes of the print job data 801. Then, the CPU 301 finishes this process. After registering the print job data 801 to the held job list 1001 as the hold-print job data, the MFP 21 executes the print process using the print job data 801 when a user's print instruction is accepted through the operation unit 307.

As a result of the determination in the step S105, when the operation mode of the MFP 12 is not the forcible hold mode, the CPU 301 manages the print job data 801 as the reservation print job data (step S107). In step the S107, the CPU 301 stores the print job data 801 into the storage unit 304. Moreover, the CPU 301 registers the print job data 801 into the held job list 1001 as the reservation print job data. Specifically, the CPU 301 sets "Reservation Printing" to the output method field 1005 and sets the reservation time included in the reservation print job data to the reservation time field 1006 of the held job list 1001 as the attributes of the print job data 801. Then, the CPU 301 finishes this process. After registering the print job data 801 to the held job list 1001 as the reservation print job data, the MFP 21 executes the print process using the print job data 801 at the reservation time set in the print job data 801. It should be noted that the user is able to check the list information about the print job data registered as the reservation print job data from the job list screen 1200 in FIG. 12 displayed on the operation unit 307 in this embodiment.

As a result of the determination in the step S104, when the output method set in the print job data 801 is not "Reservation Printing", the CPU 301 determines whether the output method set in the print job data 801 is "Hold printing" or "Normal printing" (step S108).

As a result of the determination in the step S108, when the output method set in the print job data 801 is "Hold Printing", the CPU 301 manages the print job data 801 as the hold-print job data (step S109), and finishes this process.

As a result of the determination in the step S108, when the output method set in the print job data 801 is "Normal Printing", the CPU 301 determines whether the operation mode of the MFP 12 is the forcible hold mode (step S110).

As a result of the determination in the step S110, when the operation mode of the MFP 12 is the forcible hold mode, the CPU 301 executes a process in step S109. As a result of the determination in the step S110, when the operation mode of the MFP 12 is not the forcible hold mode, the CPU 301 executes the print process using the print job data 801 (step S111), and finishes this process.

When the user switched the forcible hold mode from the invalid state to the valid state using the mode setting screen 400 after the process in FIG. 11, for example, the MFP 12 needs to perform the hold printing about the print job data 801 that was registered as the reservation print job data when the forcible hold mode was invalid. However, the conventional MFP starts printing the print job data 801 at the designated time set in the print job data 801 irrespective of the current state of the forcible hold mode. That is, since the conventional MFP cannot apply the function of the forcible hold mode to the print job data received before the forcible hold mode is set to the valid state, it causes a problem that printed matter is left as-is.

In light of this problem, the MFP 12 in this embodiment deletes the stored reservation print job data when the forcible hold mode is switched from the invalid state to the valid state before printing using the stored reservation print job data.

Figure 13:
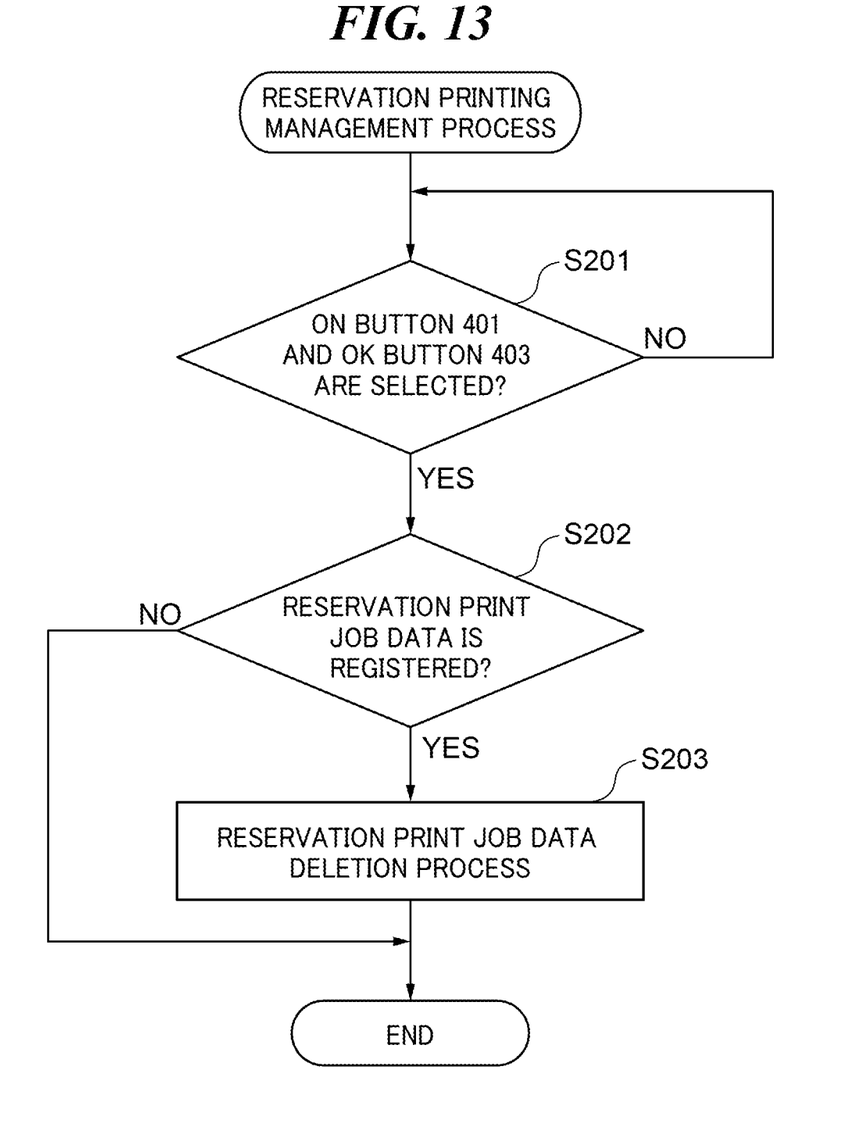
FIG. 13 is a flowchart showing procedures of a reservation printing management process executed by the MFP in FIG. 1.

FIG. 13 is a flowchart showing procedures of a reservation printing management process executed by the MFP 12 in FIG. 1.

The process in FIG. 13 is also executed when the CPU 301 runs the program stored in the ROM 303 or the storage unit 304. The process in FIG. 13 is executed when a user changes the forcible hold mode from the invalid state to the valid state using the mode setting screen 400.

As shown in FIG. 13, when detecting that the user selects the ON button 401 and selects the OK button 403 on the mode setting screen 400 (YES in the step S201), the CPU 301 determines whether reservation print job data is registered in the held job list 1001 (step S202).

Figure 12:
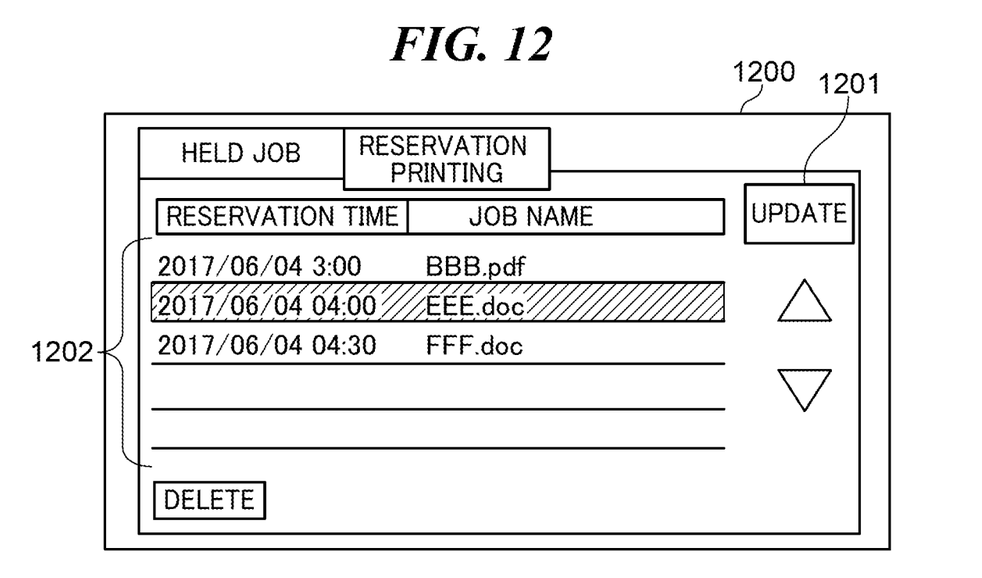
FIG. 12 is a view showing an example of a job list screen displayed on the operation unit in FIG. 3.

As a result of the determination in the step S202, when no reservation print job data is registered in the held job list 1001, the CPU 301 finishes this process. As a result of the determination in the step S202, when the reservation print job data is registered in the held job list 1001, the CPU 301 performs a reservation print job data deletion process (step S203). Specifically, the CPU 301 deletes all the reservation print job data stored in the storage unit 304 from the storage unit 304 in the step S203. Moreover, the CPU 301 deletes the records 1008, 1009, and 1010 about all the registered reservation print job data from the held job list 1001. Then, the CPU 301 finishes this process. When the user selects an update button 1201 in the job list screen 1200 displayed on the operation unit 307 after the process in the step S203, no reservation print job data is displayed in a job list 1202 of the job list screen 1200.

According to the process in FIG. 13, the stored reservation print job data are deleted when the forcible hold mode is switched from the invalid state to the valid state before printing using the stored reservation print job data. This prevents the print of the reservation print job data registered in the held job list 1001 from starting at the designated time, which reduces the leaving of the printed matter due to lack of the function of the forcible hold mode.

Although the present invention is described with the embodiment mentioned above, the present invention is not limited to the embodiment mentioned above. For example, when the forcible hold mode is switched from the invalid state to the valid state before executing the print process using the stored reservation print job data, the attributes of the reservation print job data in the held job list 1001 may be changed.

Figure 14:
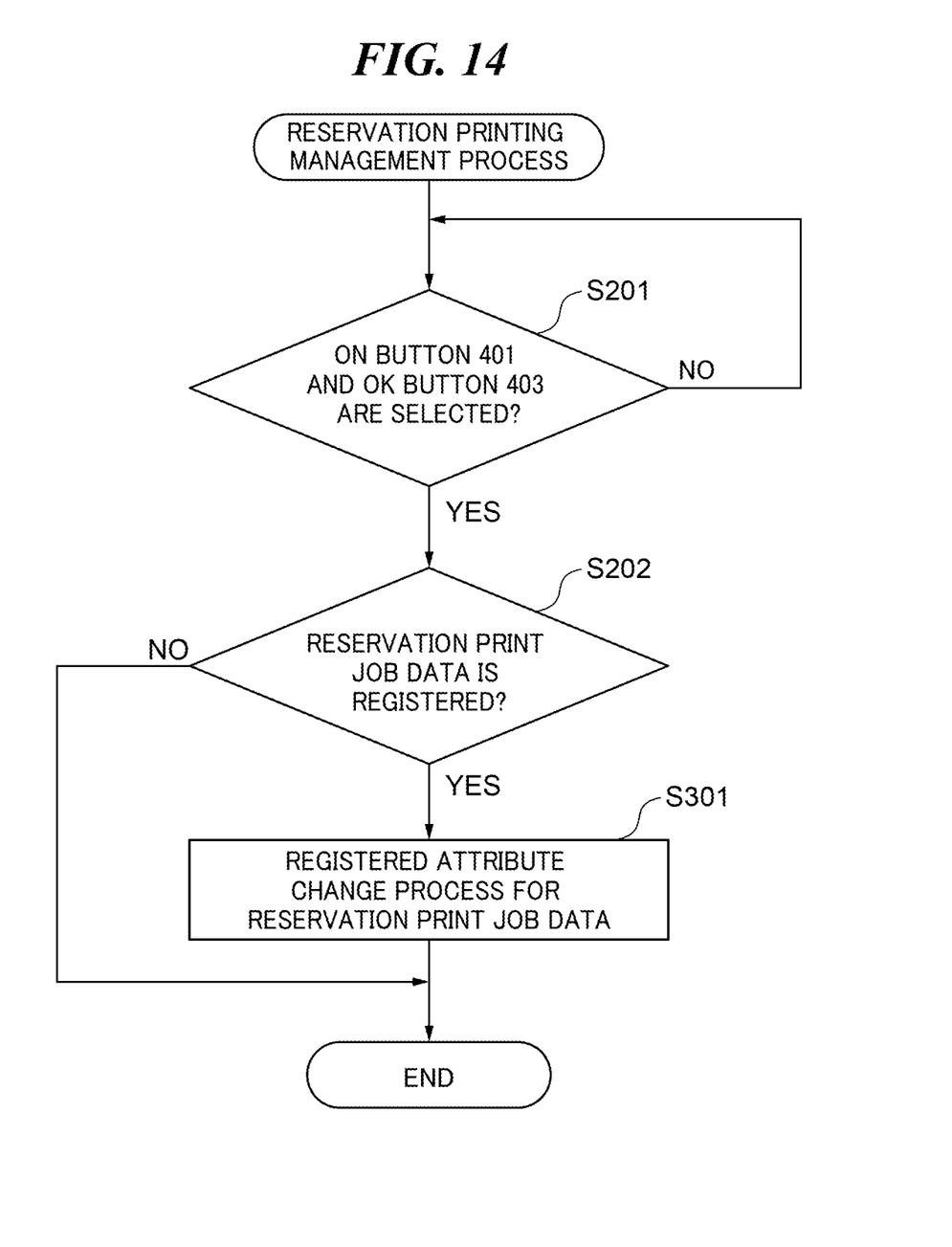
FIG. 14 is a flowchart showing procedures of a modified example of the reservation printing management process in FIG. 13.

FIG. 14 is a flowchart showing procedures of a modified example of the reservation printing management process in FIG. 13.

The process in FIG. 14 is also executed when the CPU 301 runs the program stored in the ROM 303 or the storage unit 304 and when a user changes the forcible hold mode to the valid state from the invalid state using the mode setting screen 400.

As shown in FIG. 14, the CPU 301 first executes the process in the steps S201 and S202.

As a result of the determination in the step S202, when no reservation print job data is registered in the held job list 1001, the CPU 301 finishes this process. As a result of the determination in the step S202, when the reservation print job data is registered in the held job list 1001, the CPU 301 executes a registered attribute change process about the reservation print job data (step S301). Specifically, the CPU 301 holds all the reservation print job data stored in the storage unit 304 in the step S301. Moreover, the CPU 301 changes "Reservation Printing" in the output method field 1005 to "Hold Printing" and changes the reservation time in the reservation time field 1006 to "Null" about all the reservation print job data registered in the held job list 1001. Then, the CPU 301 finishes this process.

In the process in FIG. 14, when the forcible hold mode is switched from the invalid state to the valid state before printing using the stored reservation print job data, the registration attributes of the reservation print job data in the held job list 1001 are changed into the registration attributes corresponding to the hold-print job data. This prevents the print of the reservation print job data registered in the held job list 1001 from starting at the designated time, which reduces the leaving of the printed matter due to lack of the function of the forcible hold mode.

Moreover, the operation unit 307 may display the fact that the reservation print job data has been deleted or the fact that the registered attributes of the reservation print job data in the held job list 1001 have been changed in the embodiment mentioned above. Thereby, a user is notified that the print of the reservation print job data does not start at the designated time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188363, filed Sep. 28, 2017, which is hereby incorporated by reference herein in its entirety.

What is claimed is:

1. An image forming apparatus comprising:
a memory storing instructions; and
a processor which is capable of executing the instructions to cause the image forming apparatus to:
set one of a valid state and an invalid state about a forcible hold printing function that holds print job data when the print job data is received and prints using the print job data held in response to a user's print instruction;
receive print job data from an external apparatus;
store the received print job data in a case where the forcible hold printing function is set to the invalid state and the received print job data is time-setting print job data which will start printing at a set-up designated time;
print the stored time-setting print job data at the set-up designated time without a user's print instruction; and
delete the stored time-setting print job data that has not yet been printed, but will start printing at the set-up designated time, in response to the forcible hold printing function being switched from the invalid state to the valid state before the stored time-setting print job data is printed.

2. The image forming apparatus according to claim 1, wherein the instructions further cause the image forming apparatus to notify a user that the time-setting print job data has been deleted.

3. The image forming apparatus according to claim 1, wherein, in a case where the forcible hold printing function is the valid state and the received print job data is the time-setting print job data, the received print job data is stored as hold-print job data that starts printing in response to a user's print instruction.

4. An image forming apparatus comprising:
a memory storing instructions; and
a processor which is capable of executing the instructions to cause the image forming apparatus to:
set one of a valid state and an invalid state about a forcible hold printing function that holds print job data when the print job data is received and prints using the print job data held in response to a user's print instruction;
receive print job data from an external apparatus;

store the received print job data in a case where the forcible hold printing function is set to the invalid state and the received print job data is time-setting print job data which will start printing at a set-up designated time;

print the stored time-setting print job data at the set-up designated time without a user's print instruction; and change an attribute of the stored time-setting print job data that has not yet been printed, but will start printing at the set-up designated time, to an attribute corresponding to hold-print job data that starts printing in response to a user's print instruction in response to the forcible hold printing function being switched from the invalid state to the valid state before the stored time-setting print job data is printed.

5. The image forming apparatus according to claim 4, wherein the instructions further cause the image forming apparatus to notify a user that the attribute of the time-setting print job data has been changed.

6. A control method for an image processing apparatus, the control method comprising:

setting one of a valid state and an invalid state about a forcible hold printing function that holds print job data when the print job data is received and prints using the print job data held in response to a user's print instruction;

receiving print job data from an external apparatus;

storing the received print job data in a case where the forcible hold printing function is set to the invalid state and the received print job data is time-setting print job data which will start printing at a set-up designated time;

printing the stored time-setting print job data at the set-up designated time without a user's print instruction; and deleting the stored time-setting print job data that has not yet been printed, but will start printing at the set-up designated time, in response to the forcible hold printing function being switched from the invalid state to the valid state before the stored time-setting print job data is printed.

7. A control method for an image processing apparatus, the control method comprising:

setting one of a valid state and an invalid state about a forcible hold printing function that holds print job data when the print job data is received and prints using the print job data held in response to a user's print instruction;

receiving print job data from an external apparatus;

storing the received print job data in a case where the forcible hold printing function is set to the invalid state and the received print job data is time-setting print job data which will start printing at a set-up designated time;

printing the stored time-setting print job data at the set-up designated time without a user's print instruction; and changing an attribute of the stored time-setting print job data that has not yet been printed, but will start printing at the set-up designated time, to an attribute corresponding to hold-print job data that starts printing in response to a user's print instruction in response to the forcible hold printing function being switched from the invalid state to the valid state before the stored time-setting print job data is printed.

8. A non-transitory computer-readable storage medium storing a control program causing a computer to execute a control method for an image forming apparatus, the control method comprising:

setting one of a valid state and an invalid state about a forcible hold printing function that holds print job data when the print job data is received and prints using the print job data held in response to a user's print instruction;

receiving print job data from an external apparatus;

storing the received print job data in a case where the forcible hold printing function is set to the invalid state and the received print job data is time-setting print job data which will start printing at a set-up designated time;

printing the stored time-setting print job data at the set-up designated time without a user's print instruction; and deleting the stored time-setting print job data that has not yet been printed, but will start printing at the set-up designated time, in response to the forcible hold printing function being switched from the invalid state to the valid state before the stored time-setting print job data is printed.

9. A non-transitory computer-readable storage medium storing a control program causing a computer to execute a control method for an image forming apparatus, the control method comprising:

setting one of a valid state and an invalid state about a forcible hold printing function that holds print job data when the print job data is received and prints using the print job data held in response to a user's print instruction;

receiving print job data from an external apparatus;

storing the received print job data in a case where the forcible hold printing function is set to the invalid state and the received print job data is time-setting print job data which will start printing at a set-up designated time;

printing the stored time-setting print job data at the set-up designated time without a user's print instruction; and changing an attribute of the stored time-setting print job data that has not yet been printed, but will start printing at the set-up designated time, to an attribute corresponding to hold-print job data that starts printing in response to a user's print instruction in response to the forcible hold printing function being switched from the invalid state to the valid state before the stored time-setting print job data is printed.

* * * * *